United States Patent [19]

Marsalka et al.

[11] 4,311,363
[45] Jan. 19, 1982

[54] AUXILIARY MIRROR ATTACHMENT UNIT FOR REAR VIEW MIRROR

[75] Inventors: Joseph P. Marsalka; John P. Kennedy, both of Columbus, Ohio

[73] Assignee: Mirrorcraft, Inc., Columbus, Ohio

[21] Appl. No.: 34,292

[22] Filed: Apr. 30, 1979

[51] Int. Cl.³ .............................................. G02B 7/18
[52] U.S. Cl. ................................... 350/299; 248/467
[58] Field of Search .............. 350/67, 293, 288, 303, 350/299, 310, 320, 307; 248/467, 473, 488

[56] References Cited

U.S. PATENT DOCUMENTS

| | | | |
|---|---|---|---|
| 2,307,568 | 1/1943 | Colbert | 350/67 |
| 3,104,274 | 9/1963 | King | 350/299 |
| 3,563,638 | 2/1971 | Panozzo | 350/293 |
| 4,029,399 | 6/1977 | Haile | 350/293 |
| 4,139,269 | 2/1979 | Backenkohler | 350/293 |

*Primary Examiner*—Jon W. Henry
*Attorney, Agent, or Firm*—Robert E. Stebens

[57] ABSTRACT

An auxiliary mirror attachment unit for mounting on a primary mirror is provided having a support housing and an optical reflecting element assembled with the housing. The support housing includes an integrally formed base plate and a peripheral wall projecting laterally from the plate. The reflecting element is of plate form having a peripheral edge of a configuration to interfit with the housing's peripheral wall. Mechanical interlocking of the reflecting element with the housing in assembled relationship is effected by cooperatively interfitting tongue and groove conformations formed on the respective peripheral edge of the reflecting element and on an inwardly facing surface of the peripheral wall. The support housing is formed from a material having a minimum degree of resilience to enable mechanical assembly with the reflecting element. Attachment of the unit to a primary mirror is accomplished by adhesive.

20 Claims, 7 Drawing Figures

AUXILIARY MIRROR ATTACHMENT UNIT FOR REAR VIEW MIRROR

BACKGROUND OF THE INVENTION

This invention is directed to an auxiliary mirror attachment unit designed for utilization with an automotive rear view mirror such as that which is mounted on an exterior side portion of the vehicle's body. The auxiliary mirror unit is of a size that is substantially smaller than the rear view mirror with which it is to be utilized and is designed to be mounted on a front exterior surface of that primary mirror. The primary mirror which may be of size approximately thirteen (13) centimeters in horizontal length and eight (8) centimeters in vertical height, has a front surface that may be the reflecting surface. The primary mirror may be formed from an optically transmissive material and the reflecting surface may then be formed at a rear or second surface.

The auxiliary mirror attachment unit, as indicated, is of a substantially lesser size than the primary mirror and is preferably positioned in a lower corner of that primary mirror to minimize its effect in appearance with the reflectivity of the primary mirror. For use with a primary mirror of the aforedescribed dimension, the auxiliary mirror unit may be sized to have a longitudinal dimension of the order of five centimeters and a vertical dimension of the order of three (3) centimeters. Also, the mirror unit is advantageously provided with a convexly curved reflecting surface to achieve a better view of the area of interest to a vehicle operator. Specifically, this auxiliary mirror attachment unit is designed to provide the vehicle operator with a particularly advantageous view of the area normally designated as the "blind spot" with reference to a particular vehicle. The primary mirror provides the large general view of an area closely adjacent to the vehicle body in a rearward direction, but the auxiliary mirror unit provides a view as to an area extending substantially further outward in a lateral direction relative to the vehicle, but which also includes the area of view of the primary mirror.

The auxiliary mirror attachment units heretofore provided comprise a molded construction that could be advantageously formed from a suitable plastic material. As a molded plastic structure, the unit could only be fabricated to have a front reflecting surface. Consequently, that surface which was provided with a silvering material to enhance its optically reflective properties was always subject to deterioration as a consequence of mechanical damage. That damage could be caused either by weather and environmental conditions or could be the result of mechanical abrasion.

SUMMARY OF THE INVENTION

It is the objective of this invention to provide an auxiliary mirror attachment unit which can be readily fabricated comprising two elements, namely, a base or support housing and an optical reflecting element carried by the housing. The support housing and optical reflecting element are formed as separate components and mechanically assembled into a unitary structure for attachment to a rear view mirror. The support housing is advantageously formed by a molding process from a suitable plastic material having a characteristic resiliency to enable assembly with the optical reflecting element. Support of the reflecting element and mechanical rigidity of that housing is enhanced through the formation of an internal ribbed structure with the housing which will assure that the reflecting element will be retained in mechanically assembled relationship therewith.

The optical reflecting element is formed as a relatively thin plate having the desired arcuately curved configuration. That curvature may be of a spherical shape and the element can be formed from either a suitable plastic material or it can be fabricated from glass. In the case of plastic material, if desired, that material may be of an opaque type or it can be optically transmissive. The reflective surface may be formed either at the first surface or it can be formed at the rear or second surface. The ribbed structure formed internally of the support housing is configured to provide a center support surface and a plurality of supporting rib edge surfaces projecting into contacting engagement with the optical reflecting element and thus enhance its structural integrity and ability to withstand mechanical forces.

A further advantage of the two piece construction of the auxiliary mirror unit constructed in accordance with this invention is that the unit can be provided in disassembled configurations and enable a person to readily assemble the desired components. A particular advantage of this is that the optical reflecting elements can be readily replaced with another similar element in the event of damage or breakage even though that event would appear to be highly unlikely.

These and other objects and advantages of this invention will be readily apparent from the following detailed description of embodiments thereof and the accompanying illustrative drawings.

DESCRIPTION OF THE DRAWING FIGURES

DESCRIPTION OF THE ILLUSTRATIVE EMBODIMENTS

Figure 1:
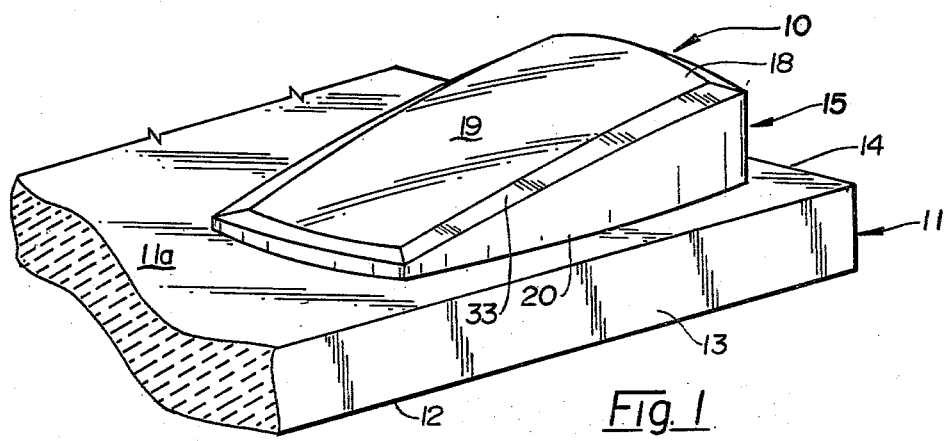
FIG. 1 is a perspective view of a rear view mirror having an embodiment of the auxiliary mirror attachment unit of this invention mounted thereon.

Having reference to FIG. 1 of the drawings, an auxiliary mirror attachment unit 10 constructed in accordance with this invention is shown mounted on a fragmentary portion of an automotive rear view mirror 11. That rear view mirror 11, for purposes of this disclosure, is defined as the primary mirror and may be of a generally rectangular configuration in plan view. As such, it performs the function of the well-known side view mirrors in providing an image of an area that normally encompasses an angular field of view in a horizontal plane of the order of 35 degrees. This primary mirror 11 is indicated as being fabricated from an optically transmissive material such as glass and the reflective surface is thus formed at the rear or second surface thereof. This reflective surface is diagrammatically illustrated as being enhanced through the application of a layer of silvering material 12. The primary mirror itself would be supported within a structural housing or mounting bracket that enables the entire unit to be secured to the side of the vehicle. That structure is not illustrated as its configuration and mechanical functioning in support of the primary mirror is well-known.

The auxiliary mirror attachment unit 10, or secondary mirror, is shown as being mounted on a corner surface area of the primary mirror. Preferably, this corner of the primary mirror is that which is associated with a bottom horizontal edge 13 and a vertical side edge 14 that is disposed next adjacent to the side of the vehicle. Accordingly, it will be seen that the mirror structure, as shown in FIG. 1, is for a mirror that is adapted to be mounted on the left side of a vehicle. In the case of a side view mirror mounted on the right side of a vehicle, the auxiliary mirror unit would be mounted on the lower left corner of the primary mirror and thus next adjacent the side of the vehicle.

Figure 2:
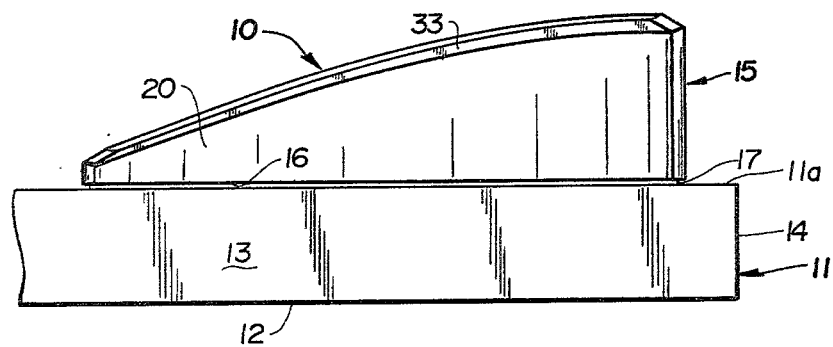
FIG. 2 is a fragmentary side elevational view on an enlarged scale of the bottom edge of the combination shown in FIG. 1.

In accordance with this invention, the auxiliary mirror unit 10 is designed to be mounted on the front surface of the primary mirror 11 and the unit thus includes a support housing 15 having a bottom or base surface 16. Mechanical mounting of the mirror unit 10 can be conveniently accomplished through use of a sheet of adhesive material indicated generally at 17. This sheet of adhesive material is designed to be adhesively bonded to the base surface 16 of the auxiliary mirror unit and to also adhere to the front surface 11a of the primary mirror regardless of whether it is made of glass or other material. This technique of attachment can be best seen in FIG. 2 which is a side elevational view of the structural combination shown in FIG. 1. The area covered by the sheet of adhesive material 17 may be less than the surface area of the auxiliary mirror unit. In fact, the material may be in the form of a pair of strips that merely extend longitudinally relative to the mirror unit and thus effect an economy in the cost of the materials.

Figure 3:
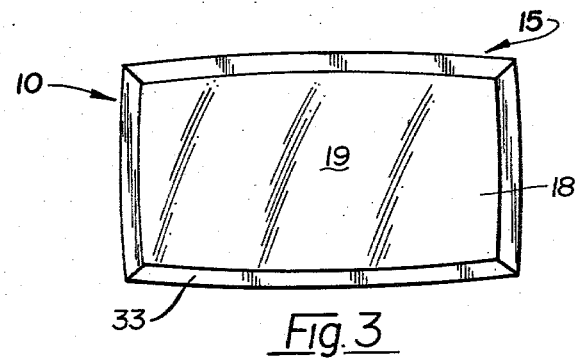
FIG. 3 is a top plan view of the mirror attachment unit.

In accordance with this invention, the auxiliary mirror unit 10 is formed in two separate components which includes the support housing 15 and an optical relfecting element 18. The two units are mechanically assembled with the optical reflecting element supported at the uppermost portion of the support housing, thus having a first surface 19 exposed externally of the assembled unit. The support housing 15 is formed with a peripheral wall and has a configuration as can be best seen in FIG. 3 which is a top plan view of the assembled unit. The illustrated housing has each of the four walls bowed slightly outward for aesthetic purposes and it will be apparent that the housing may be otherwise configured or of different relative proportions as to length and vertical height.

Figure 4:
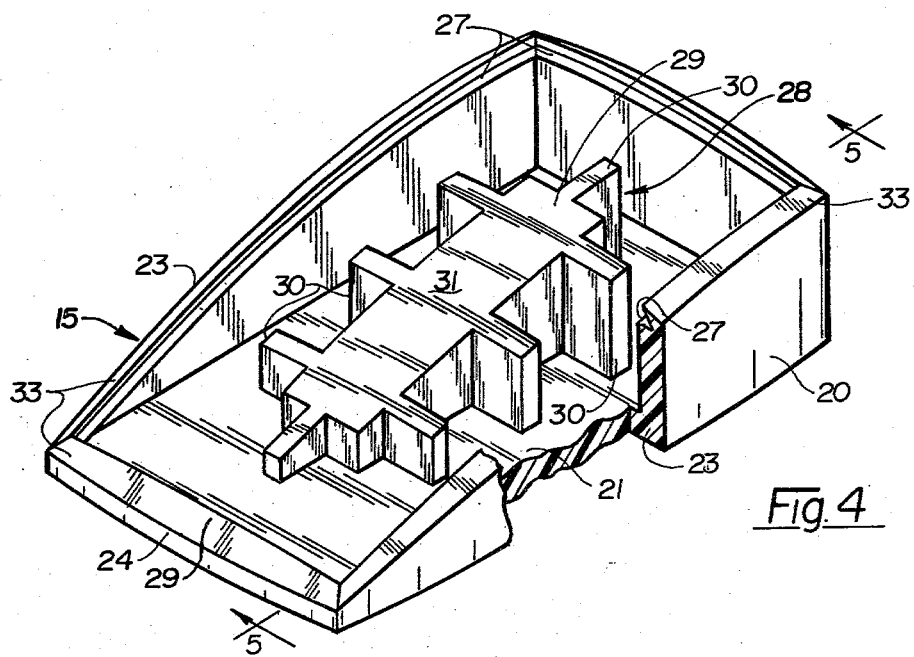
FIG. 4 is a perspective view of the support housing of the mirror attachment unit having portions thereof broken away for clarity of interior illustration.
Figure 5:
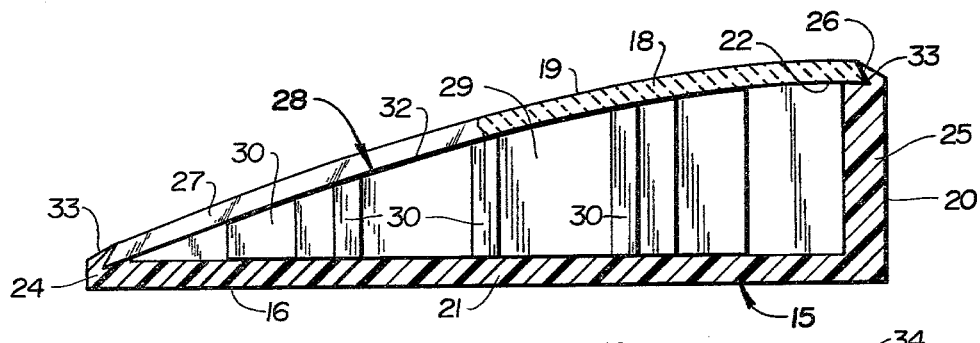
FIG. 5 is a vertical sectional view on an enlarged scale taken along lines 5—5 of FIG. 4.

Specifics of the construction of the support housing, as well as the optical reflecting element 18, can be better seen with reference to FIGS. 4 and 5. In those drawing figures it will be seen that the support housing 15 is formed with the peripheral wall 20 being integrally formed with a base plate 21 which has the base surface 16. The peripheral wall 20 projects a distance laterally from the base plate with the distance of projection, as can be seen in the figures, varying around the entire unit in order that it will accommodate the specific configuration of the illustrated reflecting element 18. In this illustrative embodiment, the reflecting element 18 comprises a thin plate that is of a spherical configuration of uniform thickness and has a rear or second surface 22 which faces inwardly of the assembled unit. Thus, the peripheral wall 20 is configured to conform with that spherical configuration. Furthermore, it will be seen that the longitudinal portions of the peripheral wall which are designated by the numeral 23 are non-uniform in depth and gradually increase from the left side as referenced to FIGS. 4 and 5. The opposite vertical end portions 24 and 25 also are not of a uniform depth throughout their vertical extent and are differing with respect to each other in accordance with the differences provided by the longitudinal side walls. While the end walls 24 and 25 are essentially of a uniform depth, it will be understood that they will have a slight variation to conform with the curvature of the optical reflecting element 18. The specific dimensioning will be understood as being determined by the specific configuration of the optical reflecting element 18 and its relative orientation to the base surface 16. Clearly, the specific dimensioning will depend on the particular reflective characteristics desired for a particular auxiliary mirror unit 10.

In accordance with this invention, the optical reflecting element 18 and the support housing 15 are provided with cooperative tongue and groove conformations to effect the mechanical interengagement. Accordingly, in the illustrative embodiment of FIGS. 4 and 5, the optical reflecting element 18 is formed with a peripheral edge 26 extending between the front or first surface 19 and second surface 22. This peripheral edge 26 is of an outwardly projecting, V-shaped configuration in cross section. Formed in the inwardly facing surface of the peripheral wall 20 at its upper end portion is a mating V-shaped groove 27. The V-shaped peripheral edge 26 extends completely around the optical reflecting element 18 and the V-shaped groove 27 similarly extends completely around the peripheral wall 20 and opens in a generally laterally inward direction with respect to that wall for receiving the edge of the reflecting element.

The optical reflecting element 18 is preferably formed from a material which results in a relatively rigid structure even though the element may be of a relatively thin section. For example, if it is desired to construct the mirror unit so that reflection will occur at the second surface 22, that element may be advantageously formed from glass or it may be formed from suitable synthetic resin materials such as the acrylic resins. Either of these two materials have the characteristic structural rigidity desired for the reflecting element. Alternatively, if it is desired that the reflecting element 18 have the reflecting surface at the first surface 19, that element may be formed from synthetic resins such as those generally designated as ABS resins having the more complete designation of acrylonitrile-butadine-styrene. These particular materials are suggestive by way of example and are not considered to be limitative in the practice of this invention.

Since the optical reflecting element 18 is preferably formed from a material that is essentially structurally rigid, it is necessary that the support housing 15 be formed from a material having a degree of resilience to permit its deformation to a sufficient extent to permit mechanical interengagement with the reflecting element. Again, appropriate synthetic resin materials may be selected for the formation of the support housing and, as an example, a material designated polypropylene may be selected. Such a material can be readily molded and has a sufficient degree of resiliency in the structural configuration illustrated in FIGS. 4 and 5 to permit assembly with an optical reflecting element.

While the support of the optical reflecting element 18 through the mechanical interconnection of its peripheral edge 26 and V-shaped groove 27 of the peripheral wall 20 is adequate, it is preferred that additional support be provided throughout the central area of the reflecting element. For this purpose, the support housing 15 is provided with a supporting rib structure generally designated by the numeral 28. This rib structure 28 may be integrally formed with the support housing 15 and includes a center post 29 of generally elongated rectangular configuration in plan view and a plurality of ribs 30 projecting laterally outward therefrom in overlying relationship to the base plate 21. The center post 29 is located centrally of the peripheral wall 20 and is formed with a surface 31 configured to conform with the second surface 22 of the optical reflecting element 18. Each of the ribs 30, whether extending transversely or longitudinally with respect to the center post, have respective edge surfaces that are continuations of the center post surface. The center post 29 and ribs 30 project a distance upwardly from the base plate 21 to place the combined surfaces 31 thereof in contacting engagement with the second surface 22 of an optical reflecting element 18 that may be assembled with the support housing 15. Providing of this rib structure 28 thus results in an extremely effective interior support for the optical reflective element as well as enhancing the structural rigidity of the base plate 21 of the support housing. Each of the ribs 30 terminates in an end edge that is inwardly spaced from the peripheral wall elements 23, 24 and 25 and thus do not interfere with the flexing of those wall elements during assembly with an optical reflecting element.

Assembly of an optical reflecting element 18 with the support housing 15 can be readily effected by first inserting one corner of the optical reflecting element in a mating corner of the V-shaped groove 27 of the support housing. With the one corner thus inserted, it is relatively easy to then distort the remaining portions of the V-shaped groove at the upper end portion of the peripheral wall so as to effect interfitting of the V-shaped peripheral edge 26 of the optical reflecting element. Once assembled in this manner, it will be seen that the optical reflecting element 18 is rigidly supported in a protective housing that maintains the element in proper relationship to the base surface 16 for obtaining the desired reflection characteristics. If deemed necessary for a particular mirror size and configuration, the optical reflecting element may be secured to the supporting rib structure 28 by a suitable adhesive as is indicated at 32 in FIG. 5.

It will also be noted that the peripheral wall 20 terminates in an edge surface 33 which is illustrated as being relatively inclined to exterior wall surfaces of the support housing. Preferably, the peripheral wall 20 is of a sufficient thickness so that this edge surface will have a predetermined width, thereby forming a definite border surrounding the optical reflecting element. Also, this edge surface 33 is advantageously configured with respect to the V-shaped groove 27 so as to form a continuation of the first surface 19 of the optical reflecting element, although because of the relative angular relationship, there will be a definite line of demarcation.

Also, the edge surface 33 is provided with a surface finish that is substantially non-reflective from an optical standpoint. It is also preferred that the exterior surfaces of the peripheral wall 20 also be provided with a surface finish that is substantially optically non-reflective.

Figure 6:
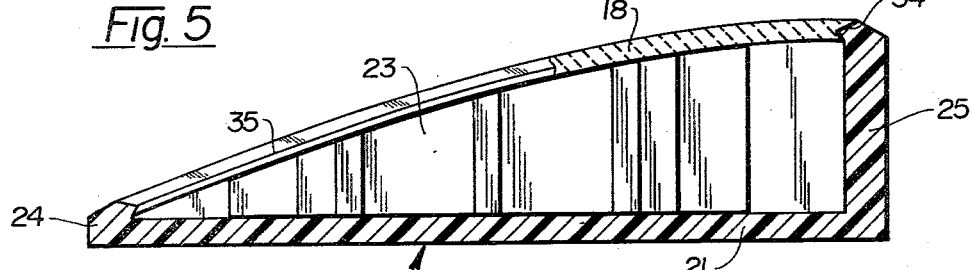
FIG. 6 is a vertical sectional view similar to FIG. 5, but of a modified form of the unit.
Figure 7:
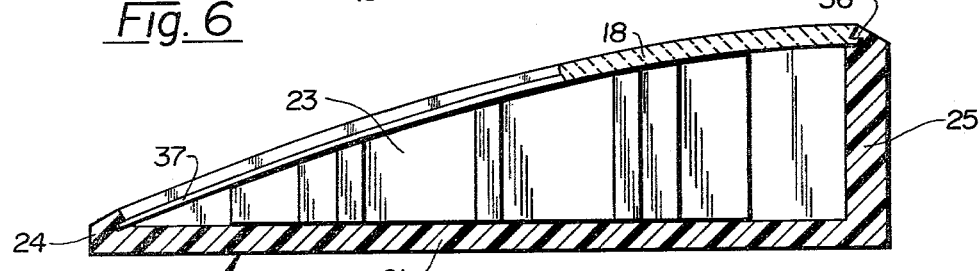
FIG. 7 is a vertical sectional view similar to FIG. 5, but showing a further modification of the unit.

A modified mirror unit is illustrated in FIGS. 6 and 7 with the differences substantially residing in the configuration of the tongue and groove conformations for the optical reflecting element and the support housing. In the FIG. 6 embodiment, the tongue and groove conformations are also of an interfitting V-shaped configuration, but are formed in an inverse relationship with respect to that of the embodiment shown in FIGS. 4 and 5. Thus, the optical reflecting element 18 is provided with a V-shaped groove 34 extending around its entire periphery with the peripheral wall 20 being provided with a V-shaped tongue 35. In the modified embodiment shown in FIG. 7, the optical reflecting element 18 is provided at its peripheral edge with a laterally projecting rib 36 which is of a rectangular cross-sectional configuration and the peripheral wall 20 of the housing is provided with a cooperatively mating groove of similar rectangular cross section. The rib 36 is preferably formed adjacent the second surface 22 of the optical reflecting element. With this arrangement, the one side surface of the rib forms an extension of that surface of the optical reflecting element.

It will be readily seen from the drawings illustrating several embodiments of this invention that a particularly advantageous auxiliary mirror attachment unit is provided for use with a primary mirror. This auxiliary mirror attachment unit is advantageously formed in two pieces that may be mechanically assembled into a unitary structure. Providing of a support housing that is readily fabricated from suitable synthetic resins by appropriate molding techniques results in a structure capable of providing the necessary support for the optical reflecting element in predetermined relationship to a base surface.

Having thus described this invention, what is claimed is:

1. An auxiliary mirror attachment unit comprising
   an optical reflecting element having first and second surfaces with one of said surfaces being an optical reflecting surface, said reflecting element formed with a peripheral edge extending between said first and second surfaces,
   a support housing for said optical reflecting element for support thereof in predetermined relationship to a mounting surface, said support housing including a mounting base having a base surface which is adapted to be disposed in superposed relationship to a mounting surface in secured relationship thereto and a support wall formed with the mounting base in laterally projecting relationship thereto, said mounting base having an adhesive material applied thereto for adhesive bonding of the unit to a mounting surface, said support wall being of continuous extent defining a closed loop with an inwardly facing surface and of a configuration to receive said optical reflecting element therein with the peripheral edge of said reflecting element in contacting engagement with the inner wall surface of said support wall, said support wall being formed from a material having a characteristic resilience to permit assembly with said optical reflecting element, said reflecting element peripheral edge and said support wall having cooperatively configured tongue and groove conformations that mechanically interengage in interlocking relationship when said reflecting element and said support housing are disposed in cooperatively assembled relationship.

2. A mirror attachment unit according to claim 1 wherein said support wall terminates in an edge surface of predetermined width thereby defining a peripheral border surface around said optical reflecting element.

3. A mirror attachment unit according to claim 2 wherein said optical reflecting element is assembled with said support housing to place the first surface thereof in exterior relationship thereto and said support wall edge surface is conterminous with said first surface and forms a laterally outward directed continuation thereof.

4. A mirror attachment unit according to claim 1 wherein said support housing includes a supporting rib structure formed within the cavity defined by said mounting base and said supporting wall, said supporting rib structure projecting laterally form said mounting base and terminating in a supporting surface disposed in contacting engagement with the second surface of said optical reflecting element when said element is assembled with said support housing to place the first surface in exterior relationship.

5. A mirror attachment unit according to claim 1 wherein the tongue and groove conformations formed with respective ones of said optical reflecting element and said support wall are of cooperatively interfitting, V-shaped configuration in cross section.

6. A mirror attachment unit according to claim 5 wherein the peripheral edge of said optical reflecting element is formed with the tongue conformations which projects generally laterally outward with respect to said edge and said support wall is formed with the groove conformations.

7. A mirror attachment unit according to claim 1 wherein said tongue and groove conformations extend around the entire periphery of said optical reflecting element and said support wall.

8. A mirror attachment unit according to claim 1 wherein the tongue and groove conformations formed with respective ones of said optical reflecting element and said support wall are of cooperatively interfitting, rectangularly-shaped configuration in cross section.

9. A mirror attachment unit according to claim 8 wherein the peripheral edge of said optical reflecting element is formed with the tongue conformation and which projects generally laterally outward with respect thereto and said support wall is formed with the groove conformations.

10. A mirror attachment unit according to claim 1 wherein said optical reflecting element is assembled with said support housing with the first surface thereof disposed exteriorly of the unit.

11. A mirror attachment unit according to claim 10 wherein said first surface forms the reflecting surface.

12. A mirror attachment unit according to claim 10 wherein said reflecting element is formed from an optically transmissive material and said second surface forms the reflecting surface.

13. A mirror attachment unit according to claim 12 wherein said optical reflecting element is of a uniform thickness.

14. A mirror attachment unit according to claim 1 wherein said support wall is formed peripherally to said mounting base.

15. An auxiliary mirror attachment unit comprising
an optical reflecting element having first and second surfaces with one of said surfaces being an optical reflecting surface, said reflecting element formed with a peripheral edge extending between first and second surfaces,
a support housing for said optical reflecting element for support thereof in predetermined relationship to a mounting surface, said support housing including a mounting base adapted to be disposed on a mounting surface in secured relationship thereto and a support wall formed with the mounting base in laterally projecting relationship thereto, said support wall being of continuous extent defining a closed loop with an inwardly facing surface and of a configuration to receive said optical reflecting element therein with the peripheral edge of said reflecting element in contacting engagement with the inner wall surface of said support wall, said support being formed as an integral structure from a material having a characteristic resilience to permit assembly with said optical reflecting element and including a supporting rib structure formed within the cavity defined by said mounting base and said supporting wall, said supporting rib structure projecting laterally from said mounting base and terminating in a supporting surface disposed in contacting engagement with the second surface of said optical reflecting element when said element is assembled with said support housing to place the first surface in exterior relationship,
said reflecting element peripheral edge and said support wall having cooperatively configured tongue and groove conformations that mechanically interengage in interlocking relationship when said reflecting element and said support housing are disposed in cooperatively assembled relationship.

16. A mirror attachment unit according to claim 15 wherein said supporting rib structure includes a center post and a plurality of relatively narrow rib elements projecting a distance laterally from said center post and terminating in spaced relationship to said supporting wall.

17. An auxiliary mirror attachment unit comprising
an optical reflecting element having first and second surfaces with one of said surfaces being an optical reflecting surface, said reflecting element formed with a peripheral edge extending between said first and second surfaces,
a support housing for said optical reflecting element for support thereof in predetermined relationship to a mounting surface, said support housing including a mounting base adapted to be disposed on a mounting surface in secured relationship thereto and a support wall integrally formed with the mounting base in laterally projecting relationship thereto, said support wall being of continuous extent defining a closed loop with an inwardly facing surface and of a configuration to receive said optical reflecting element therein with the peripheral edge of said reflecting element in contacting engagement with the inner wall surface of said support wall, said support wall being formed from a material having a characteristic resilience to permit assembly with said optical reflecting element and terminating in an edge surface of predetermined width defining a peripheral border surface around said optical reflecting element, said reflecting element peripheral edge and said support wall having cooperatively configured tongue and groove conformations that mechanically interengage in interlocking relationship when said reflecting element and said support housing are disposed in cooperatively assembled relationship to place the first surface of said reflecting element in exterior relationship to said housing with said support wall edge surface coterminous with said first reflecting element surface and forming a laterally outward directed continuation thereof and, said support wall edge surface angularly oriented relative to said first reflecting element surface in relatively receding relationship thereto.

18. A mirror attachment unit according to claim 17 wherein at least the edge surface of said support wall is provided with a surface finish that is substantially non-reflective optically.

19. An auxiliary mirror attachment unit comprising
an optical reflecting element having first and second surfaces with one of said surfaces being an optical reflecting surface, said reflecting element formed with a peripheral edge extending between said first and second surfaces,
a support housing for said optical reflecting element for support thereof in predetermined relationship to a mounting surface, said support housing including a mounting base adapted to be disposed on a mounting surface in secured relationship thereto and a support wall formed with the mounting base in laterally projecting relationship thereto, said support wall being of continuous extent defining a closed loop with an inwardly facing surface and of a configuration to receive said optical reflecting element therein with the peripheral edge of said reflecting element in contacting engagement with the inner wall surface of said support wall,
said reflecting element peripheral edge and said support wall having cooperatively configured tongue and groove conformations of V-shaped cross-section that mechanically interengage in interlocking relationship when said reflecting element and said support housing are disposed in cooperatively assembled relationship, said reflecting element peripheral edge being formed with the groove conformation and said support wall is formed with the tongue conformation which projects laterally inward with respect to the inwardly facing surface thereof.

20. An auxiliary mirror attachment unit comprising
an optical reflecting element having first and second surfaces with one of said surfaces being an optical reflecting surface, said reflecting element formed with a peripheral edge extending between said first and second surfaces,
a support housing for said optical reflecting element for support thereof in predetermined relationship to a mounting surface, said support housing including a mounting base adapted to be disposed on a mounting surface in secured relationship thereto and a support wall formed with the mounting base in laterally projecting relationship thereto, said support wall being of continuous extent defining a closed loop with an inwardly facing surface and of a configuration to receive said optical reflecting element therein with the peripheral edge of said reflecting element in contacting engagement with the inner wall surface of said support wall, said support wall being formed from a material having a characteristic resilience to permit assembly with said optical reflecting element,
said reflecting element peripheral edge and said support wall having cooperatively configured tongue and groove conformations that are of cooperatively interfitting, rectangularly-shaped configuration in cross-section and mechanically interengage in interlocking relationship when said reflecting element and said support housing are disposed in cooperatively assembled relationship, said optical reflecting element being formed with the tongue conformation and which tongue projects generally laterally outward with respect thereto and said support wall is formed with the groove conformations, said tongue conformation formed with one side thereof being an extension of the second surface of said optical reflecting element.

* * * * *